(12) United States Patent
Hanson et al.

(10) Patent No.: US 7,824,171 B2
(45) Date of Patent: Nov. 2, 2010

(54) CORNER-CONSOLIDATING INFLATABLE APPARATUS AND METHOD FOR MANUFACTURING COMPOSITE STRUCTURES

(75) Inventors: Steven F. Hanson, Derby, KS (US); Amitabh Vyas, Wichita, KS (US)

(73) Assignee: The Boeing Company, Chicago, IL (US)

( * ) Notice: Subject to any disclaimer, the term of this patent is extended or adjusted under 35 U.S.C. 154(b) by 915 days.

(21) Appl. No.: 11/261,519

(22) Filed: Oct. 31, 2005

(65) Prior Publication Data

US 2007/0096368 A1 May 3, 2007

(51) Int. Cl.
*B29C 43/36* (2006.01)
*B28B 7/30* (2006.01)

(52) U.S. Cl. ............. 425/389; 425/403; 425/DIG. 112; 425/393; 264/313; 264/314; 264/316; 264/257; 264/258

(58) Field of Classification Search ................. 425/389, 425/DIG. 112, 417, 352, 393, 412, 517, 390, 425/403; 264/316, 315, 314, 313; 249/65
See application file for complete search history.

(56) References Cited

U.S. PATENT DOCUMENTS

| | | | | |
|---|---|---|---|---|
| 4,310,132 A | * | 1/1982 | Robinson et al. | 244/119 |
| 4,698,011 A | * | 10/1987 | Lamalle et al. | 425/389 |
| 5,292,475 A | * | 3/1994 | Mead et al. | 264/257 |
| 5,597,435 A | | 1/1997 | Desautels et al. | 156/245 |
| 6,083,448 A | * | 7/2000 | Henrio | 264/511 |
| 7,306,450 B2 | | 12/2007 | Hanson | |
| 2005/0023721 A1 | | 2/2005 | Cominsky | |
| 2006/0017200 A1 | * | 1/2006 | Cundiff et al. | 264/511 |
| 2007/0096368 A1 | | 5/2007 | Hanson et al. | |

FOREIGN PATENT DOCUMENTS

| | | |
|---|---|---|
| EP | 0171325 A1 | 2/1986 |
| EP | 447349 A1 * | 9/1991 |
| JP | 60139433 A * | 7/1985 |

OTHER PUBLICATIONS

Merriam-Webster OnLine Dictionary, http://www.merriam-webster.com/dictionary/hollow, 2 pages.*

* cited by examiner

*Primary Examiner*—Richard Crispino
*Assistant Examiner*—William P Bell

(57) ABSTRACT

An inflatable compaction tool for consolidating a composite material inside a faceted hollow or tubular mold for a composite part is made from an elastic material. The compaction tool includes relatively flat wall segments conjoined by corner segments that define a sealed chamber. The wall segments curve away from the mold surface toward the midpoint of each wall segment, so that as a pressurized fluid is introduced into the compaction tool, a component of the force exerted on the tool interior surface is transmitted through the wall segments toward the corner segments. Thus, during initial inflation, the corner segments are forced toward the corner regions of the mold before the wall segments contact the composite material, firmly compressing the composite material into the corner regions of the mold before the friction of the wall segments against the composite material inhibits expansion of the corner segments into the mold corner regions.

18 Claims, 4 Drawing Sheets

CORNER-CONSOLIDATING INFLATABLE APPARATUS AND METHOD FOR MANUFACTURING COMPOSITE STRUCTURES

FIELD OF THE INVENTION

The present invention relates generally to composite part manufacturing. More particularly, the present invention relates to apparatuses, systems and methods for laminating fiber-reinforced resin materials in hollow, faceted molds.

BACKGROUND OF THE INVENTION

Composite materials, including, for example, fiber-reinforced resin materials, offer a number of advantages over conventional metal materials including high strength-to-weight ratios and good corrosion resistance. Conventional composite materials typically include glass, carbon or polyaramide fibers in woven or non-woven configurations. In the raw material stage the fibers can be preimpregnated with resin or left dry. If dry, the fibers can be infused with resin after layup on a mold surface. Heat or pressure can be applied to the resin-impregnated fibers on the mold surface to cure the resin and harden the laminate in the shape of the mold. The heat or pressure can be applied with an oven, an autoclave, a heated flat or contoured forming tool, or a combination of methods including the use of a vacuum bag.

Composite parts can be formed in the above manner on both male and female tools. With male tools, the composite plies are applied to an exterior mold surface that forms an inner mold line of the part. Adding plies to the layup on a male tool increases the thickness of the part and changes the outer mold line, but the inner mold line remains unchanged. Conversely, with female tools, the composite plies are applied to an interior mold surface that forms an outer mold line of the part. Adding plies to the layup on a female tool increases the thickness of the part and changes the inner mold line, but the outer mold line remains unchanged.

Female tools are desirable when the mating surface is located on the exterior of a part because female tools allow the outer mold line (i.e., the exterior surface) to be tightly controlled. Female tooling (also known as "outer mold line tooling") is also desirable when making multiple parts having the same external dimensions but different thicknesses. Aircraft fuselages, for example, often have multiple frames with the same external dimensions but different thicknesses. In this situation, all of the frames can be made with a single female tool because the tool allows the thickness to vary without changing the external dimensions. If future growth of the aircraft requires further thickening of the frames, this can be achieved without changing tooling. Conversely, if male tooling were used, then a separate tool would be required for each different frame thickness.

A hollow or tubular mold is a special case of female tooling including at least one enclosed cross section. Some hollow or tubular molds can be faceted, that is, can include a combination of relatively flat wall segments and conjoining internal radii, or corner regions, that define an enclosed cross section or a cavity. In this case an inflatable mandrel, or bladder, can be positioned inside the hollow or tubular mold and can be inflated to compress the composite material against the interior surface of the mold. However, when manufacturing composite parts with hollow or tubular tooling, the composite plies sometimes "bridge" or wrinkle across corner regions of the mold surface, resulting in poor consolidation or resin richness of the composite material in corner regions, with inferior material properties, including, for example, excess material thickness and porosity.

Solid mandrels made of a material with a coefficient of thermal expansion that is higher than that of the mold or the composite material, for example, aluminum or Teflon, have been used with hollow or tubular molds to avoid corner bridging and wrinkling. However, the use of these mandrels is generally limited to mold for composite parts that have smooth, straight interior surfaces, because curves, bends or angles on the mold interior surfaces can prevent removal of the solid mandrel after the composite material has been cured.

To address this problem, mandrels have also been made from materials with a relatively high coefficient of thermal expansion that can be washed or broken out of the mold after the composite material has been cured. Such materials include eutectic salts and soluble plasters. However, these mandrels require significant investment in casting tools, drying ovens, storage racks, and the like. In addition, these materials have low tensile strength, which tends to make the mandrels fragile and requires careful handling. Furthermore, some of these materials generate environmentally hazardous waste.

Accordingly, it is desirable to provide a method and apparatus that can more evenly compress a composite material against the relatively flat wall surfaces and into the internal corner regions of a hollow or tubular mold, that can be removed from molds for composite parts that have curved or angled internal surfaces, that can be reused, and that in some instances can be relatively easily and inexpensively manufactured without generating substantial environmentally hazardous waste.

SUMMARY OF THE INVENTION

The foregoing needs are met, to a great extent, by the present invention, wherein in one aspect an apparatus is provided that in some embodiments can compress a composite material against the relatively flat wall surfaces and into the internal corner regions of a hollow or tubular mold in a more even manner than some existing devices, can be removed from molds for composite parts that have curved or angled internal surfaces, can be reused, and can be relatively easily and inexpensively manufactured without generating substantial environmentally hazardous waste.

In accordance with one aspect of the present invention, an expandable compaction tool for consolidating a composite element having at least one enclosed cross section can include a corner segment configured to compress a composite material into an internal corner region of a mold as the tool expands, and a wall segment configured to compress the composite material against an interior wall of the mold as the tool expands. In addition the tool can be configured such that as the tool expands the corner segment begins to compress the composite material before the at least a portion of the wall segment begins to compress the composite material.

In accordance with another aspect of the present invention, an expandable compaction tool for consolidating a composite element having at least one enclosed cross section can include corner means for compressing a composite material into an internal corner region of a mold as the tool expands, and wall means for compressing the composite material against an interior wall of the mold as the tool expands. In addition, the tool can be configured such that as the tool expands the corner means begins to compress the composite material before the wall means begins to compress the composite material.

In accordance with yet another aspect of the present invention, a method of consolidating a composite element having at least one enclosed cross section can include expanding a compaction tool, compressing a composite material into an internal corner region of a mold, and then compressing the composite material against an interior wall of the mold such that the composite material is substantially evenly consolidated around the one enclosed cross section.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
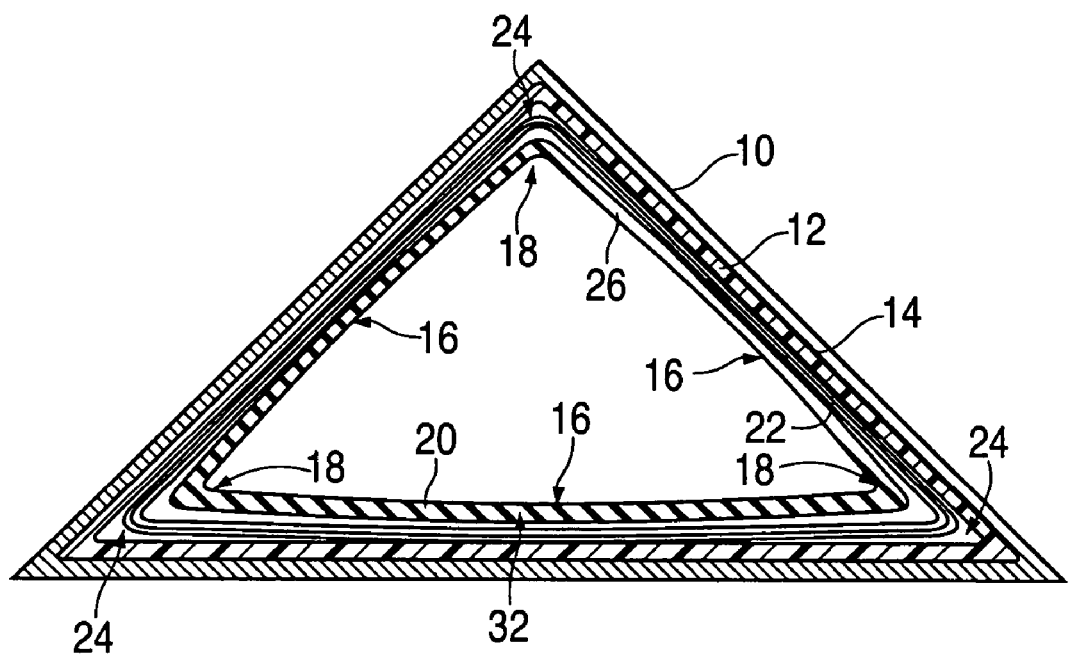
FIG. 1 is a cross-sectional end view illustrating bridging of a composite material near the corner regions of a prior art composite manufacturing tool.

An embodiment in accordance with the present invention provides an inflatable compaction tool that can be inflated inside a hollow or tubular faceted mold to compress a composite material against the interior walls and corner regions of the mold. The disclosed inflatable compaction tool combines the conformable and reusable aspects of an inflatable mandrel and the consolidation aspects of a solid mandrel having a relatively high coefficient of thermal expansion. The inflatable compaction tool can be used either with enclosed, hollow molds or with open-ended, tubular molds that have a combination of relatively flat wall regions joined by corner regions with internal radii. For example, the inflatable compaction tool can be used to manufacture aircraft fuselage composite stringers having a trapezoidal, or "hat-shaped," cross section.

Before inflation, the compaction tool can have external walls that generally conform to the shape of the internal surfaces of the corresponding mold. However, the compaction tool can have external dimensions such that a void is formed between the compaction tool exterior surface and the mold interior surface. The dimension of the void can be equal to or greater than the bulk thickness of an uncured composite material that can be applied to the interior mold surface to form a composite part.

Furthermore, the inflatable compaction tool exterior wall surfaces can have a contour or curvature such that before inflation the compaction tool exterior wall surfaces curve away from the mold interior wall surfaces. That is, the void, or gap, between the compaction tool exterior surface and the mold interior surface can increase with increased distance from the corner regions, such that the gap between the compaction tool exterior surface and the mold interior surface is greatest approximately halfway between each pair of corner regions connected by a relatively flat wall region.

Thus, as the compaction tool is initially inflated, the internal fluid pressure can apply an outward force to the interior surface of compaction tool walls that can be transmitted through the curved wall segments of the compaction tool to force the corner segments of the compaction tool toward the corner regions of the mold before the compaction tool wall segments contact the composite material. Thus, the frictional forces between the compaction tool and the composite material resisting expansion of the compaction tool into the mold corner regions can be substantially reduced or minimized during the initial inflation of the compaction tool. This can allow the compaction tool corner segments to firmly compress the composite material into the corresponding corner regions of the mold before the central, relatively flat wall segments of the compaction tool contact the composite material, or before the compaction tool wall segments press against the composite material with sufficient force to create sufficient frictional forces to effectively inhibit expansion of the compaction tool corner segments into the mold corner regions.

As a result, bridging or wrinkling of the composite material across the mold corner regions can be substantially avoided. Thus, improved corner consolidation of the composite material can be realized. That is, the reduction in fiber density in the corner regions of the finished composite part, which can develop with the use of some existing mandrels, can be avoided with the use of an embodiment of the disclosed compaction tool.

The invention will now be described with reference to the drawing figures, in which like reference numerals refer to like parts throughout. FIG. 1 illustrates a cross-sectional end view of a hollow or tubular mold 10 with a composite material 12 arranged on the interior surface 14 of the mold 10. The mold 10 has multiple relatively flat side regions, or interior wall regions 16, joined by internal radii, or corner regions 18. A representative existing inflatable mandrel 20, or bladder, can be positioned inside the hollow or tubular mold 10 and inflated to compress the composite material 12 and secure the composite material 12 against the mold interior surface 14 or against a previous ply surface 22 during a curing cycle or process.

In this configuration, as the inflatable mandrel 20 is inflated, the pressure presses the composite material 12 firmly against the interior wall regions 16, and the resulting friction between the composite material 12 and the wall regions 16 causes the composite material 12 to resist movement into the internal radius regions and bridge across the corner regions 18, thereby reducing the fiber density in the corner regions 18. For example, several layers, or plies 24, of the composite material 12 are shown bridging to various degrees across the corner regions 18 of the mold 10 in FIG. 1. The resulting reduction in fiber density in the corner regions can compromise the structural integrity of the finished product.

Figure 2:
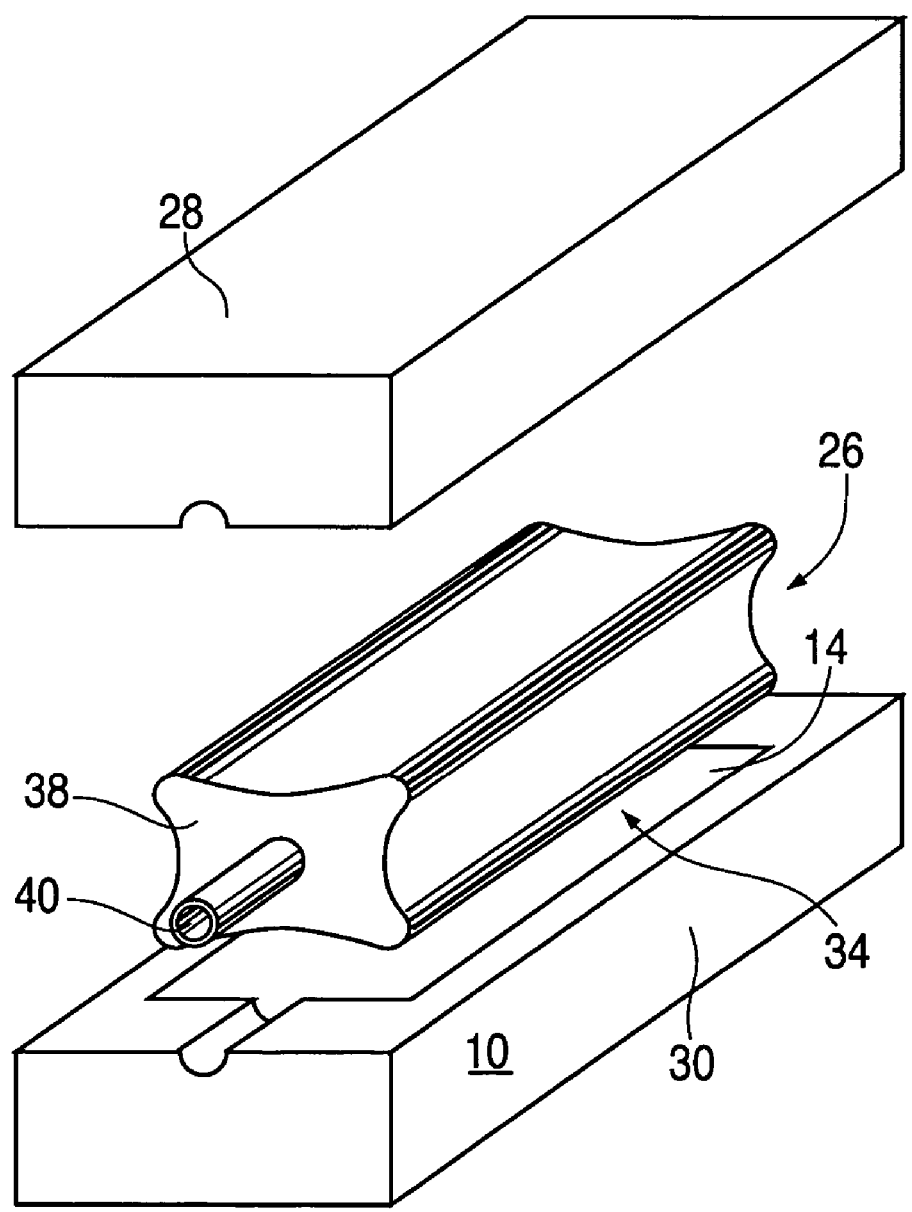
FIG. 2 is a perspective view of an inflatable compaction tool according to a preferred embodiment of the invention for manufacturing a composite part having a rectangular cross section.

An embodiment of the present inventive apparatus and method is shown in FIG. 2, which illustrates a faceted hollow or tubular inflatable compaction tool 26 for manufacturing a composite part having a rectangular cross section. The inflatable compaction tool 26 can be used, for example, in combination with a faceted hollow or tubular composite part mold 10. As shown in FIG. 2, the mold 10 can have an upper component 28 and a lower component 30. However, in other embodiments, the mold 10 can have any suitable number of components, such as a one-piece mold, a three-piece mold, and so on. In addition, although the mold 10 and inflatable compaction tool 26 shown in FIG. 2 are configured to form a composite part of rectangular cross section, in other embodiments the mold 10 and inflatable compaction tool 26 can be configured to form a composite part of any size and shape that includes at least one enclosed cross section, that is, at least one cross section having a continuous, closed or unbroken perimeter, such as a square, triangular, trapezoidal, rhomboid, circular or elliptical cross section.

Figure 3:
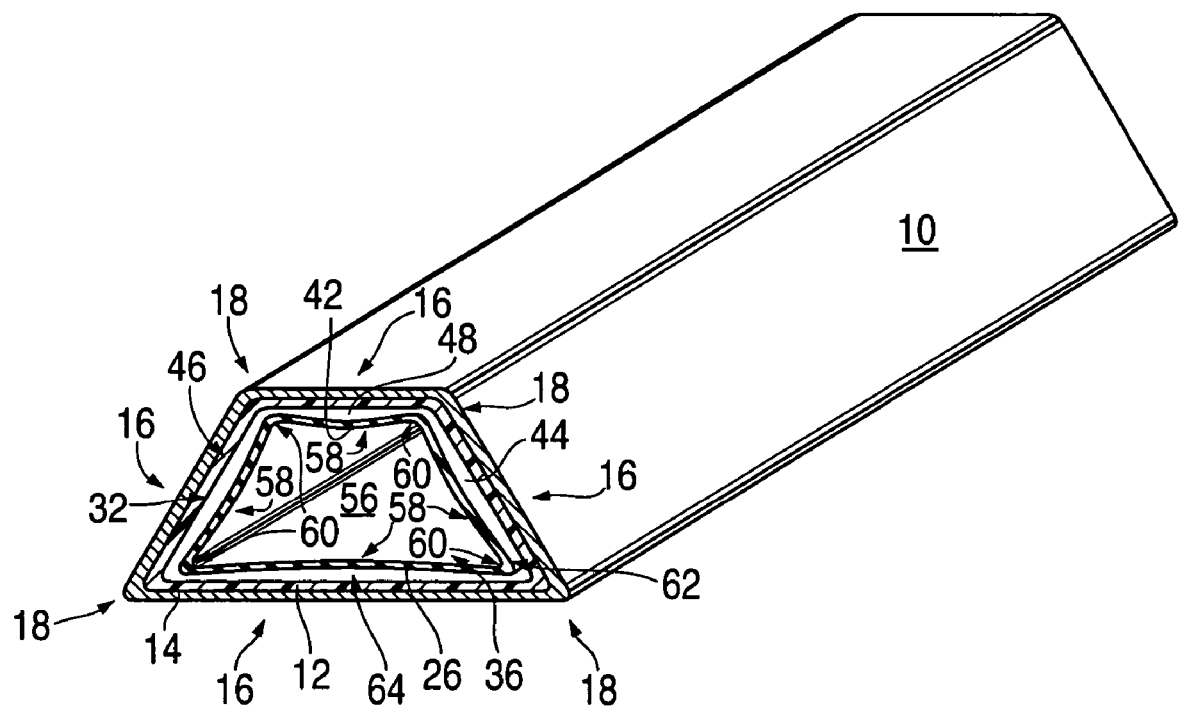
FIG. 3 is a cut-away perspective view of an inflatable compaction tool for manufacturing a composite part having a trapezoidal cross section.

FIG. 3 illustrates a cut-away perspective view of a mold 10 and an inflatable compaction tool 26 for manufacturing a composite part having a cross section 32 of trapezoidal shape, for example, an aircraft stringer having a "hat-shaped" cross section. As shown in FIG. 3, the composite part mold 10 can have a combination of relatively flat interior wall regions 16 and internal radii, or interior corner regions 18, that define the enclosed cross section 32, or that define a cavity 34 (as shown in FIG. 2) in the case that all cross sections of the mold 10 are enclosed. The inflatable compaction tool 26 can be inserted into the enclosed cross section 32 or cavity 34 to compress the composite material 12 against the mold interior surface 14 or a previous ply surface 22 during a curing cycle.

The inflatable compaction tool 26 further can form a sealed, or fluid-tight, chamber 36. For example, the compaction tool 26 can have an enclosed, hollow shape, such as a sphere or a pyramid; or a generally tubular shape with enclosed ends 38, as illustrated in FIG. 2. In addition, the compaction tool 26 can include a fluid inlet 40, or port, shown in FIG. 2, which can optionally include a unidirectional valve (not shown), to facilitate the introduction of a pressurized fluid into the compaction tool 26. For example, air or another gas can be introduced into the compaction tool 26 at a pressure greater than that of the atmosphere or ambient.

As shown in FIG. 3, a composite material 12, such as a fiber-reinforced synthetic resin matrix, can be arranged on the interior surface 14 of the mold 10 for curing. The composite material 12 can include a plurality of fiber plies, for example, a dry composite fabric or a "preimpregnated" fabric impregnated with a resin. If the fiber plies are initially dry when arranged on the mold 10, a resin infusion system can be used to infuse the composite material 12 with resin after the plies have been arranged on the mold interior surface 14. For example, the resin can be infused into the composite material 12 using the resin infusion system disclosed in U.S. patent application Ser. No. 10/953,670, entitled "Apparatuses, Systems, and Methods for Manufacturing Composite Parts," filed on Sep. 29, 2004, the disclosure of which is hereby incorporated by reference in its entirety.

Furthermore, the compaction tool 26 can be made from an elastic material, such as an elastomer, so the compaction tool 26 can be flexible and resilient to changes in shape. Thus, the inflatable compaction tool 26 can expand to a larger size as a pressurized fluid is introduced into the compaction tool 26 and return to a substantially original size and shape as the pressurized fluid is exhausted, that is, when the pressure of the fluid in the compaction tool 26 returns to atmospheric pressure.

In various embodiments, the compaction tool 26 can be formed from any suitable material that can expand and flex under pressure, and behave elastically through a range of deflections, including a sheet of metal, such as stainless steel or aluminum; a thermoplastic material, which can be easily and relatively inexpensively manufactured so that the compaction tool 26 can be disposed of after a single use without incurring significant costs.

In an alternative embodiment, an interior wall 42 of the inflatable compaction tool 26 can be formed from a rigid material, such as a metal, and an exterior wall 44 of the inflatable compaction tool 26 can be formed from a flexible or elastic material. In this alternative embodiment, the pressurized fluid can be introduced between the interior wall 42 and the exterior wall 44, and the interior wall 42 can maintain a uniform shape as the exterior wall 44 distends during inflation of the compaction tool 26.

The original, or uninflated, shape of the compaction tool 26 can generally conform to the shape of the interior surface 14 of the composite part mold 10. However, the compaction tool 26 can be sized such that a void, or gap 46, exists between the exterior surface 48 of the uninflated compaction tool 26 and the interior surface 14 of the composite part mold 10. The gap 46 can have a dimension, or width, that is approximately equivalent to the uncured thickness of the composite material 12 that is to be arranged on the mold 10.

Figure 4:
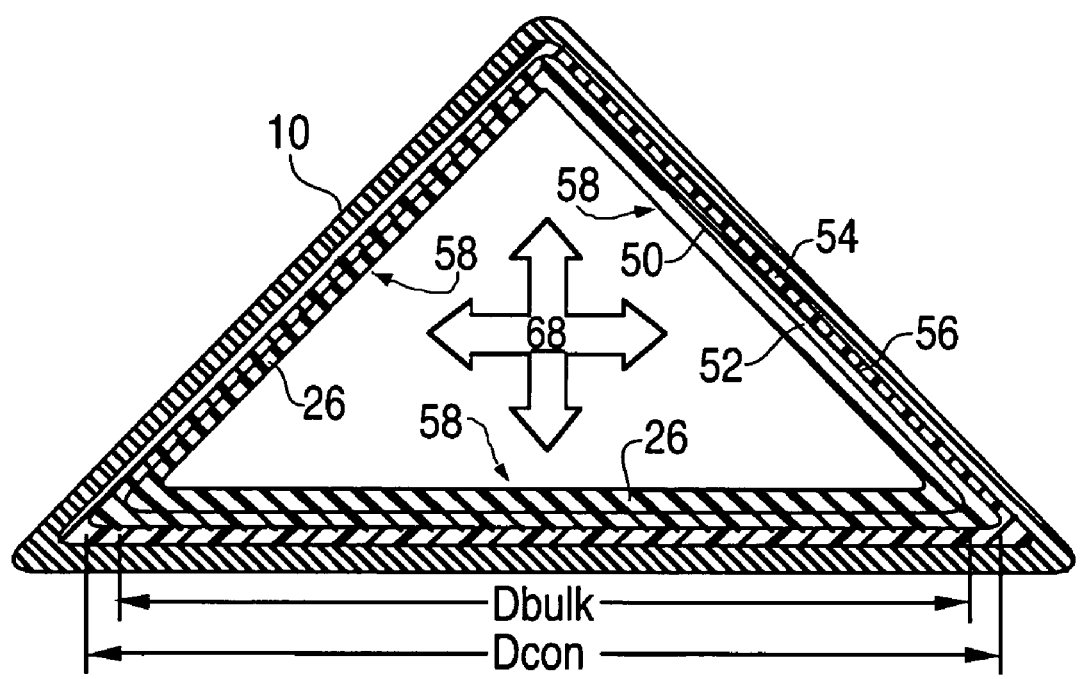
FIG. 4 is a cross-sectional end view of an inflatable compaction tool for manufacturing a composite part having a triangular cross section.

For example, as illustrated in FIG. 4, which illustrates an inflatable compaction tool 26 for manufacturing a composite part having a triangular cross section, the compaction tool 26 can have an uninflated external size that closely corresponds to the interior surface 50 of the additive uncured composite bulk 52 when arranged on the mold 10 before curing (the bulk or uncured composite material filling the combined thickness of the cured, or consolidated, composite material 54 and the additive uncured composite bulk 52, since the composite material 12 shrinks during the curing process). In a preferred embodiment, the uninflated external size of the inflatable compaction tool 26 can be marginally smaller than the interior surface 50 of the additive uncured composite bulk 52, such that the uninflated exterior surface 48 of the inflatable compaction tool 26 has a clearance fit with the interior surface 50 of the additive uncured composite bulk 52.

Likewise, the compaction tool 26 can have an inflated external size that closely corresponds to the interior surface 56 of the consolidated composite material 54 after curing, or of the finished composite part. Thus, during the curing or consolidation process, the inflatable compaction tool 26 must expand from the unconsolidated dimension, $D_{bulk}$, to the consolidated dimension, $D_{con}$, of the composite material 12, as depicted in FIG. 4.

Returning to FIG. 3, a preferred embodiment of the inflatable compaction tool 26 can include, for example, two or more wall segments 58 and two or more corner segments 60 that correspond to the mold wall regions 16 and corner regions 18. In addition, the compaction tool 26 wall segments 58 can be contoured or curved such that the exterior surfaces 50 of the tool wall segments 58 can be generally concave relative to the mold wall regions 16, as shown in FIG. 3. That is, the gap 46 between the tool wall segments 58 and the mold wall regions 16 can increase with increased distance from a corner region 18 of the mold 10, as depicted in FIG. 3.

Thus, a minimum gap 62 between the exterior surface 48 of the uninflated compaction tool 26 and the interior surface 14 of the mold 10 can be located approximately at a centerpoint of a tool corner segment 60 or a mold corner region 18, and a maximum gap 64 can be located approximately at a midpoint along a tool wall segment 58 and a mold wall region 16. The midpoint can be, for example, approximately halfway between two compaction tool corner segments 60 or between two mold corner regions 16.

In operation, as a result of the contour or curvature of the tool wall segments 58, as the compaction tool 26 is initially inflated a component of the normal force exerted on an interior surface 66 of the tool wall segments 58 by the pressurized fluid 68 (depicted in FIG. 4) can be transmitted laterally through the tool wall segments 58 toward the tool corner segments 60. Thus, the tool corner segments 60 can be forced toward the mold corner regions 18 during initial inflation of the compaction tool 26 before the tool wall segments 58 contact the composite material 12 arranged on the mold wall regions 16. As a result, the friction between the tool exterior surface 48 and the composite material 12 arranged on the mold interior surface 14 can be substantially reduced or minimized during initial inflation, allowing the composite material 12 arranged on the mold corner regions 18 to be firmly compressed between the tool corner segments 60 and the mold corner regions 18.

As inflation continues, the tool wall segments 58 eventually become relatively flattened and compress the composite material 12 arranged on the mold wall regions 16, as shown in FIG. 4. This process or method, implementing the inflatable compaction tool 26, can significantly reduce bridging or wrinkling of the composite material 12 in the mold corner regions 18, resulting in a relatively uniform fiber density throughout the composite material 12 during the curing cycle and enhanced properties of the cured composite material 12 in the finished composite part.

After the composite material 12 has been cured, resulting in the consolidated dimension, $D_{con}$, or profile, of the consolidated composite material 54, the compaction tool 26 can be deflated by releasing the pressurized fluid 68 to the atmosphere or partially evacuating fluid from the compaction tool 26. Thus, the compaction tool 26 can be easily removed from the mold 10.

Although the inflatable compaction tool 26 is illustrated in FIG. 2, FIG. 3 and FIG. 4 having a cross section that is respectively rectangular, trapezoidal, or triangular, many other shapes can be implemented, for example, shapes having at least one square, rhomboid, circular or elliptical cross section. Moreover, the inflatable compaction tool 26 can implement more complex shapes, wherein one or more surfaces are not flat, smooth or straight, including, for example, beveled or partially beveled surfaces, curved surfaces, such as round or elliptical surfaces, angled surfaces, or other contoured surfaces.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An expandable compaction tool for consolidating a composite element having at least one enclosed cross section, comprising:

at least one pair of corner segments configured to compress a composite material into internal corner regions of a mold as the tool expands; and a curved wall segment configured to compress the composite material against an interior wall of the mold as the tool expands, the wall segment being concave to the interior wall of the mold along a substantially entire length thereof between the corner segments when the tool is unexpanded, the wall segment conforming to the interior wall of the mold when the tool is expanded, the tool being configured such that as the tool expands, the wall segment is disposed in non-contacting relation to the composite material such that the corner segments compress the composite material into the internal corner regions of the mold before the wall segment contacts and begins to compress the composite material; and a faceted enclosed chamber defined by a plurality of the corner segments and a plurality of the wall segments.

2. The compaction tool of claim 1, wherein the composite element further comprises a generally tubular shape.

3. The compaction tool of claim 1, wherein the tool is configured such that an exterior unexpanded cross-sectional shape of the tool has a clearance fit with an interior uncured cross-sectional shape of the composite element, and an exterior expanded cross-sectional shape of the tool conforms to an interior cured cross-sectional shape of the composite element.

4. The compaction tool of claim 1, wherein the tool is configured such that when the tool is unexpanded, at least one of the corner segments is convex and the wall segment is concave.

5. The compaction tool of claim 4, wherein the tool is further configured such that as the tool expands, the corner segments first compress the composite material into the internal corner regions of the mold and the wall segment then compresses the composite material against the interior wall of the mold causing the composite material to be substantially evenly consolidated around the one enclosed cross section.

6. The compaction tool of claim 1, wherein the tool is formed from an elastic material.

7. The compaction tool of claim 6, wherein the elastic material defines an enclosed chamber that is substantially sealed so that a fluid under a fluid pressure that is greater than an ambient pressure can be introduced into the chamber to inflate the tool.

8. The compaction tool of claim 7, further comprising a fluid inlet in fluid communication with the chamber to facilitate introduction of the pressurized fluid into the chamber.

9. The compaction tool of claim 1, wherein the composite material comprises a plurality of laminate layers and the tool is configured to compress the layers together to consolidate the composite material during a curing process.

10. The compaction tool of claim 1, wherein the composite material comprises a resin matrix and a fiber reinforcement.

11. The compaction tool of claim 1, wherein the tool is configured to compress the composite material while in an uncured state and secure the composite material during a curing process.

12. The compaction tool of claim 1, wherein the composite element further comprises an aircraft fuselage stringer having a trapezoidal cross section.

13. An expandable compaction tool for consolidating a composite element having at least one enclosed cross section, comprising:

at least one pair of corner means for compressing a composite material into internal corner regions of a mold as the tool expands; and curved wall means for compressing the composite material against an interior wall of the mold as the tool expands, the wall means being concave to the interior wall of the mold along a substantially entire length thereof between the corner means when the tool is unexpanded, the wall means conforming to the interior wall of the mold when the tool is expanded, the tool being configured such that as the tool expands, the wall means are in non-contacting relation to the composite material such that the corner means compress the composite material into the internal corner regions of the mold before the wall means contact and begin to compress the composite material; and inflatable chamber means having facets and being defined by a plurality of the corner means and a plurality of the wall means.

14. The compaction tool of claim 13, wherein the compaction tool is configured such that an exterior unexpanded cross-sectional shape of the compaction tool has a clearance fit with an interior uncured cross-sectional shape of the composite element, and an exterior expanded cross-sectional shape of the compaction tool conforms to an interior cured cross-sectional shape of the composite element.

15. The compaction tool of claim 13, wherein the compaction tool is configured such that when the compaction tool is unexpanded, the corner means are convex and the wall means is concave.

16. The compaction tool of claim 13, wherein the compaction tool is further configured such that as the compaction tool expands the corner means first compress the composite material into the internal corner regions of the mold and the wall means then compress the composite material against the interior wall of the mold causing the composite material to be substantially evenly consolidated around the one enclosed cross section.

17. The compaction tool of claim 13, wherein the compaction tool is formed from an elastic material that defines an enclosed chamber that is substantially sealed so that a fluid under a fluid pressure that is greater than an ambient pressure can be introduced into the chamber to inflate the compaction tool.

18. The compaction tool of claim 13, wherein the composite element further comprises an aircraft fuselage stringer having a trapezoidal cross section.

* * * * *